United States Patent Office 3,708,340
Patented Jan. 2, 1973

3,708,340
GALVANIC BATTERY WHEREIN EACH CELL IS ENCLOSED IN A COVER COMPRISING ELECTRICALLY INSULATING AND ELECTRICALLY CONDUCTIVE PLASTIC FOILS
Pentti Juuse Tamminen, Otsolahdentie 6, Tapiola, Finland
Filed June 28, 1971, Ser. No. 157,350
Claims priority, application Finland, June 29, 1970, 1,819/70
Int. Cl. H01m 21/00
U.S. Cl. 136—111
5 Claims

ABSTRACT OF THE DISCLOSURE

A galvanic battery is described wherein the cell or each cell is enclosed in a cover comprising two plastic foils tightly jointed to each other, one of said foils consisting of an electrically insulating plastic material and the other consisting of an electrically conductive plastic material, and only the electrically insulating plastic foil being provided with at least one opening for establishing contact to one electrode of the cell.

BACKGROUND OF THE INVENTION

Figure 1:
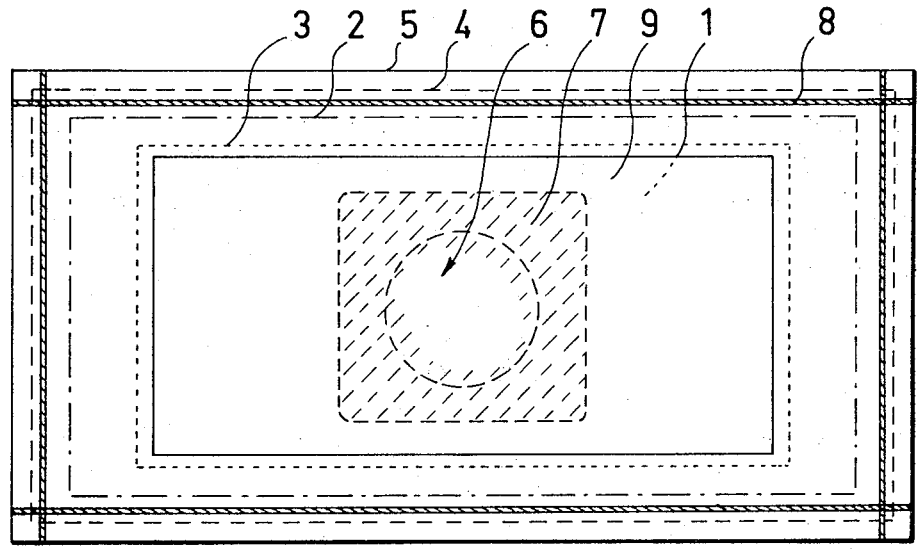

This invention relates to galvanic batteries, particularly flat cell batteries, in which each cell is enclosed in an envelope comprising two plastic foils which are joined watertight along their borders, preferably by heat sealing.

DESCRIPTION OF THE PRIOR ART

In the known batteries of this kind both said plastic foils are electrically insulating, and both of them have at least one opening through which an electrical contact is established to the positive and negative electrodes of the cell.

As a rule, these known batteries are of the Leclanché-type, obviously because such construction cannot effectively prevent an alkaline electrolyte from oozing from one cell to another, and so destroying the battery. Alkaline flat cell batteries are not commercially available despite the fast that an alkaline $MnO_2$-zinc battery has nearly twice the wh-capacity of a corresponding battery incorporating a chloride electrolyte.

SUMMARY OF THE INVENTION

The object of this invention, therefore, is to provide an improved battery construction that is suitable also for alkaline batteries, which may also be electrically rechargeable.

This object is accomplished by improved sealing due to the arrangement that one of the two sheets of plastic foil forming the bulk of the cell envelope is electrically conductive, the other being electrically insulating, and only the latter is provided with at least one opening through which an electrical contact is established to one electrode of the cell, and that each such opening is sealed watertight at an around the contact passage, and that there is a sheet of electrically conductive material acting as current collector at least against that side of the cell envelope which comprises the conductive plastic foil.

When a multicell battery is made by stacking such cells upon each other the sheets of electrically conductive material between the cells secure an even distribution of the electrical current through each electrochemically active layer, and a leakage of the electrolyte through the openings tighly sealed at an around the contact passages is effectively prevented when the cells are compressed together and between two rigid plates added to the ends of the battery stack.

The invention is further illustrated by means of examples shown in the accompanying drawing.

SHORT DESCRIPTION OF THE DRAWING

Figure 2:
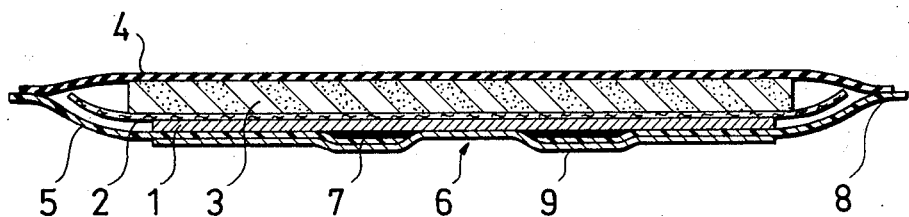
Figure 3:
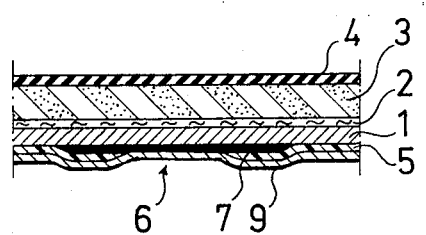
Figure 4:
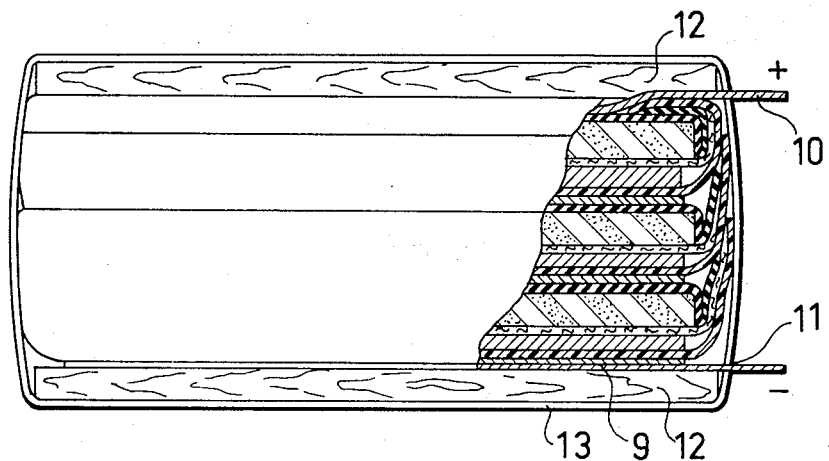
Figure 5:
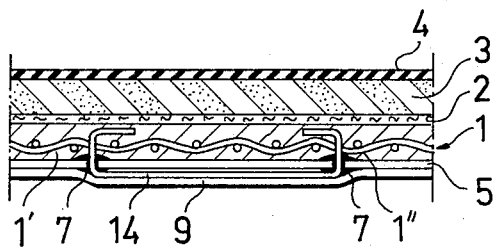
Figure 6:
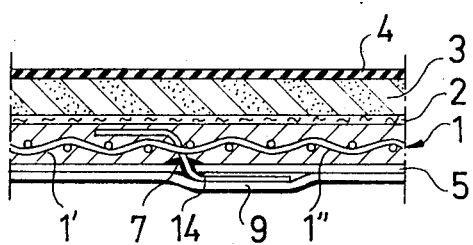
Figure 7:
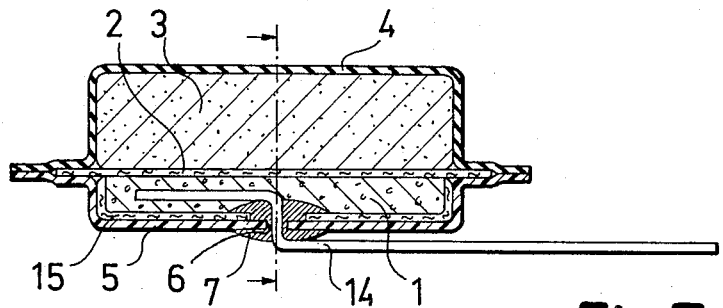
Figure 8:
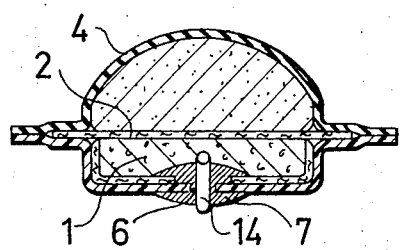
Figure 9:
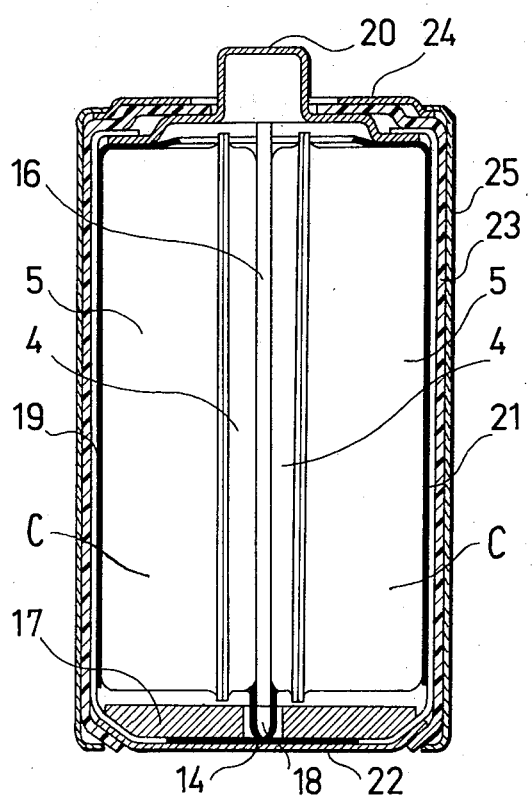

In the drawings
FIG. 1 i sa top view of a cell,
FIG. 2 is a vertical sectional view of the cell of FIG. 1,
FIG. 3 is a vertical sectional view of the middle part of a cell otherwise similar to the cell shown in FIG. 2,
FIG. 4 is a vertical, partly sectional view of an assembled battery comprising three cells as shown in FIG. 1,
FIG. 5 is a vertical, sectional view of the middle part of a cell especially suitable for alkaline batteries,
FIG. 6 is a modification of the cell shown in FIG. 5,
FIG. 7 shows a longitudinal sectional view of a cell in accordance with the invention intended for use in a cylindrical battery.
FIG. 8 is a cross-sectional view of the cell of FIG. 7, and
FIG. 9 shows in larger scale a longitudinal sectional view of a cylindrical battery embodying two cells as shown in FIGS. 7 and 8,
In the various embodiments shown in the drawings corresponding parts have been indicated by the same reference numerals.

DESCRIPTION OF THE PREFERRED EMBODIMENTS

Referring to FIG. 1 and to FIG. 2, 1 is a zinc plate, 2 is a separator sheet and 3 is a depolarizing mix layer comprising carbon, $MnO_2$ and electrolyte. Plastic foil 4 is of softened PVC, polyethylene or some other suitable plastic material which is made electrically conductive by addition of carbon or some finely divided metal that is inert in the used electrolyte, e.g. titanium in the case of a chloride electrolyte. The foil 4 is heat sealed at 8 to an electrically insulating foil 5 of the same plastic material as the foil 4, with an opening 6 in the middle. A layer of sealing material 7, which may have been applied on the zinc plate 1 by silk screen method, fixes the plastic foil 5 to the zinc plate 1 tightly around the opening 6. In this example sealing material 7 is preferably sticky and water repellent, such as soft microcrystalline wax, polyisobutylene or silicone grease, and it may partly extend inside the borders of the opening 6 leaving a clean contact spot in the middle, as shown in FIG. 1. Therefore, a tin foil 9, which is placed against the plastic foil 5, is attached to the zinc plate 1 along the borders of the opening 6, which facilitates the assemblying of batteries made of several cells. Then tin foils 9 fall against that side of the adjacent cell which consists of conductive plastic foil 4, acting as its current collector. Instead of tin foil the current collector 9 may be of some other metal or conductive material, e.g. graphite felt. It may also be laminated or otherwise fixed on conductive plastic foil 4 before assembling of the cell. In that case sheet 9 in FIG. 2 would be on the other side of the cell possibly fully covering the plastic foil 4. In case the battery comprises one cell only, there should always be a current collector layer in contact with the conductive plastic foil 4. Plastic foils 4 and 5 may be joined watertight along their borders instead of heat sealing also by adhesive or cement or by a fluid, solidifying insulating compound. For high current applications conductive foil 9 may be of copper that is soldered or welded to electrode 1 at 6. In case of an alkaline electrolyte electrode 1 may consist of a layer of zinc powder mix and a copper foil as current collector adjacent to the plastic foil 5.

In another embodiment of the invention shown in FIG. 3 the sealing material 7 is made electrically conductive by addition of finely divided carbon, silver or some other suitable material. In this case layer 7 may fully cover the opening 6. It may also be a metal disc or a patch of similar material as the conductive plastic foil 4, heat sealed or otherwise fixed watertight around the borders of the opening 6.

FIG. 4 illustrates a battery assembled of three cells as shown in FIG. 1 and in FIG. 2. According to the invention there is a sheet of electrically conductive material, such as a tin foil 9 acting as current collector at least against that side of each cell which comprises the conductive plastic foil 4. At each end of the battery stack there are stronger metal plates 10 and 11 to which the wires to the terminals of the battery may be soldered. These plates 10 and 11 acting as current collectors, tin foils 9 at the ends of the battery stack may be omitted. The battery stack is compressed between two rigid insulating plates 12 of e.g. plywood, by bands 13 which may be of rubber. As shown in FIG. 2 the insulating plastic sheets 5 may advantageously be larger than the conductive plastic sheets 4. In the assembled battery the borders of these insulating plastic sheets 5, turned towards the positive end of the battery, overlap each other so eliminating any danger of short circuits between the cells.

FIG. 5 shows an example of the invention especially adapted to alkaline batteries, in which zinc is used in the form of an amalgamated powder mix, including a current collector of e.g. a copper net. In FIG. 5 which illustrates a cell in principle similar to that shown in FIG. 2, corresponding parts are indicated by the same reference numbers. Instead of zinc plate 1 of FIG. 2 the negative electrode in FIG. 5 consists of an amalgamated zinc powder mix 1' with a current collector net 1'' of copper, brass, galvanized steel or some other suitable metal. In the insulating plastic sheet 5 there are two small openings through which both ends of a length of e.g. a tinned copper wire 14 extend into the cell where they are bent along the current collector 1'', while a part of the wire 14 is on the other side of the plastic foil 5. The passages of the wire 14 through the plastic foil 5 are sealed watertight by an insulating compound such as viscous microcrystalline wax, and this sealing is further secured when the cell in the assembled battery is pressed against the adjacent cell or against the end plate of the battery. Electrical contact to the zinc electrode of the cell is established by the copper wire 14, which also may be of any oher suitable metal.

FIG. 6 shows a modification in which the contact wire 14 is pierced through plastic foil 5 only once. Otherwise the cell is as shown in FIG. 5 In this case the contact wire 14 may also extend outside the battery stack, and at the negative end of the battery even to the terminal of the battery, which arrangement saves a metal plate at that end.

In case the zinc mix layer 1' is reasonably thick, as for example, about 2 mm. or more, current collector 1'' may be omitted because a certain length of wire 14, e.g. of the order of 1–5 cm., is sufficient to collect the current from the zinc electrode which possesses a good conductivity.

Referring to FIG. 7, it shows an example of an alkaline manganese dioxide cell in accordance with the invention. The cell is composed of a base sheet 15 of paper upon which is placed a zinc electrode 1 including a mass of amalgamated zinc powder. Upon the zinc electrode 1 is placed a separator sheet 2, and on the top of the separator sheet a depolarizing mix cake 3 of carbon and manganese dioxide. The components 15, 1, 2 and 3 are enclosed in a cover formed by an electrically conductive plastic foil 4 and an electrically insulating plastic foil 5 which are tightly joined along the borders, e.g. by heat sealing. By subjecting the assembled battery components 15, 1, 2 and 3 to vacuum when joining the cover foils 4 and 5, these are caused to conform tightly to the contour of the battery elements so that no air pockets will remain inside the cover.

A metal wire 14 of tinned copper or any other suitable metal is passing from the outside through an opening in the insulating plastic foil 5 and in the base paper 15 respectively into the zinc electrode 1. The embodiment shown is of the kind referred to above where the zinc electrode is sufficiently thick so that no other current collector is required. The opening 6 around wire 14 in plastic foil 5 is tightly closed by sealing material 7.

The base paper 15 improves the performance of the battery acting as a moisture reservoir. It may also be larger than shown in the drawing with its edges folded around the zinc electrode in order to prevent short circuits and to provide an additional electrolyte reserve.

FIG. 9 shows a cylindrical battery containing two cells according to FIGS. 7 and 8. The cells C are placed on a base disc 17 of cardboard with their flat sides against a central support plate 16 of cardboard or plastic having substantially the same height and width as the cells. Through a central opening 18 in the base disc the metal wires 14 of the cells are passing and then bent parallel to the base disc. The cells C are wrapped as shown in a current collector 19 of metal foil. The metallic positive terminal 20 of the battery is placed against the current collector 19 at the upper end portion of cells C, and all the parts mentioned are held together by a band of adhesive tape or a sheath 21 of shrinkable plastic. The metallic negative terminal disc 22 of the battery is placed against the metal wires 14. The battery is enclosed as shown in an inner insulating cover 23 of plastic and an outer steel shell consisting of an upper end disc 24 and a mantle portion 25.

It is apparent to those skilled in the art that in certain applications positive and negative electrodes may change place in the pattern of the shown embodiments, and that the principles of the present invention are in many variations applicable to a great number of especially alkaline battery types, also rechargeable ones, within the scope of following claims.

What is claimed is:

1. A galvanic battery comprising at least one cell having a negative electrode and a positive electrode enclosed in an envelope comprising two plastic foils which are joined watertight along their borders, advantageously by heat sealing, one of said plastic foils being electrically conductive, the other being electrically insulating, at least one opening being provided in the electrically insulating plastic foil for establishing an electrical contact to one electrode of the cell, said opening being sealed watertight at and around the contact passage, and a layer of electrically conducting material acting as current collector placed at least against that side of the cell envelope which comprises the conductive plastic foil.

2. Galvanic battery as in claim 1, said insulating plastic foil having larger length and width dimensions than said conductive plastic foil.

3. Galvanic battery as in claim 1, said negative electrode of each cell consisting of a mass of amalgamated zinc powder supported by a metal netting, an electrically conductive means placed in contact with said negative electrode and said metal netting and passing in sealed watertight relation through said opening in said insulating plastic foil.

4. Galvanic battery as in claim 3, comprising two cells of substantially semi-cylindrical shape having a flat portion comprising said electrically insulating plastic foil and a curved portion comprising said electrically conductive plastic foil and placed with their flat portions adjacent to each other on a base disc, said electrically conductive means of said cells passing through said base disc into contact with one terminal of the battery, a current collector layer wrapping said curved portions of said cells and at least partially the end portions thereof remote from said one terminal, the other terminal of the battery being placed in contact with said current collector layer, and a rigid insulated cylindrical shell enclosing the battery.

5. Galvanic battery as in claim 4, compromising a rigid support plate having substantially the same length and width dimensions as the cells inserted between the cells.

References Cited

UNITED STATES PATENTS

| | | | |
|---|---|---|---|
| 2,745,894 | 5/1956 | Nowotny | 136—111 |
| 2,830,110 | 4/1958 | Kirkman | 136—111 |
| 2,870,235 | 1/1959 | Soltis | 136—111 |
| 3,060,256 | 10/1962 | Paulson | 136—103 |
| 3,525,647 | 8/1970 | Strauss | 136—111 |
| 3,634,142 | 1/1972 | Eaton | 136—111 |
| 3,607,430 | 9/1971 | Glover | 136—111 |

ANTHONY SKAPARS, Primary Examiner

U.S. Cl. X.R.

136—133